Figure 1:
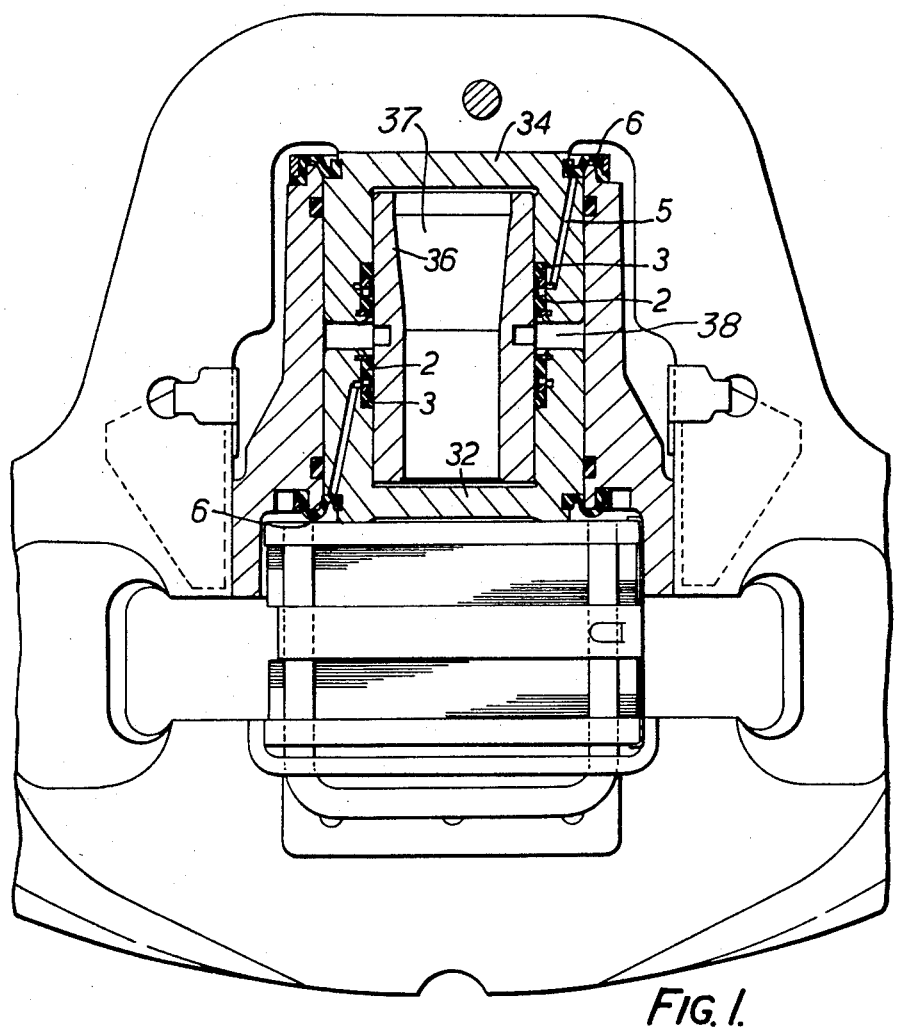

United States Patent
Hoenick

[15] 3,704,652
[45] Dec. 5, 1972

[54] HYDRAULIC BRAKES
[72] Inventor: Hermann H. Hoenick, Immendorf, Germany
[73] Assignee: Girling Limited
[22] Filed: June 8, 1970
[21] Appl. No.: 44,333

[30] Foreign Application Priority Data
June 9, 1969   Great Britain.....................29,078/69

[52] U.S. Cl. ..................92/5, 92/75, 92/86, 188/152, 277/62
[51] Int. Cl..............................................F01b 7/02
[58] Field of Search ........188/152; 92/75, 69, 110, 5, 92/112, 86, 160, 158; 277/62, 59

[56] References Cited

UNITED STATES PATENTS

| | | | |
|---|---|---|---|
| 3,403,602 | 10/1968 | Brandon | 92/75 X |
| 1,545,936 | 7/1925 | Black | 92/112 |
| 2,946,316 | 7/1960 | Bruehl | 92/112 X |
| 3,011,315 | 12/1961 | Menichello | 92/75 |
| 3,268,232 | 8/1966 | Richards | 277/59 X |
| 3,402,790 | 9/1968 | Rath | 92/75 |
| 3,554,333 | 1/1971 | Hoenick | 92/75 |

FOREIGN PATENTS OR APPLICATIONS

| | | | |
|---|---|---|---|
| 649,171 | 9/1962 | Canada | 277/62 |

Primary Examiner—Martin P. Schwadron
Assistant Examiner—Leslie J. Payne
Attorney—Scrivener, Parker, Scrivener & Clarke

[57] ABSTRACT

The invention relates to an improved sealing arrangement for an hydraulic brake actuator comprising a pair of pistons having their skirts slidingly and sealingly engaged over a common sleeve. Each sealing arrangement comprises a pair of annular sealing members having a space between them connected to a low pressure region (for example at atmospheric pressure) so that if either seal should fail, fluid will leak into the space and away to the lower pressure region, so as to give a visual indication of seal failure.

3 Claims, 2 Drawing Figures

PATENTED DEC 5 1972 3,704,652

HYDRAULIC BRAKES

This invention relates to hydraulic brake actuators comprising a cylinder containing a pair of pistons having annular skirts which are directed towards each other and are each slidingly sealed over a common sleeve which divides the space enclosed within the cylinder between the two pistons into two separate pressure chambers having separate inlets for the supply of hydraulic fluid. Such an actuator is described and illustrated in the specification of co-pending patent application Ser. No. 781,860 filed Dec. 6, 1968 now U.S. Pat. No. 3,554,333. The present invention is directed to improving the sealing arrangement between each of the piston skirts and the common sleeve. The improvements herein are primarily directed at ensuring compliance with changing requirements of Road Traffic Regulations of some countries by ensuring that, in the event of loss of pressure in one part of the pressure system, the sealing members of the remaining part will continue to act in the same manner as is normal operation of the full system. In the actuator described and illustrated in the above-mentioned co-pending application, there is a single sealing ring between each piston skirt and the common sleeve, and if either of these sealing rings fails, there is no loss of fluid from the dual system, merely an equalization of fluid pressures between the two systems. The brake can still be applied by the driver, but a greater pedal travel will be required to obtain a given braking force. The system is thus inherently safe, but does not give any indication, other than excessive pedal travel, that there has been a failure.

The invention consists primarily in the improved sealing arrangement between each of said piston skirts and said common sleeve comprising a pair of annular sealing members axially spaced apart and defining a space between the, and passage means connecting said space to a region of low pressure to which fluid passing either of said sealing members can pass.

Figure 2:
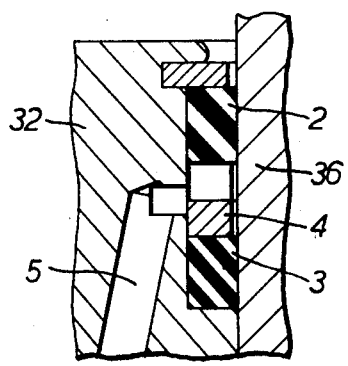

One constructional form of brake actuator in accordance with the invention is described below, by way of example only, with reference to the accompanying drawings, in which:

FIG. 1 is a part sectional plan view of the actuator incorporated in a disc brake; and FIG. 2 is an enlarged scrap section of the ringed portion of FIG. 1.

The actuator shown in FIG. 1 is generally similar in construction and operation to that described in co-pending application Ser. No. 781,860 and includes a pair of pistons 32, 34 working in a common cylinder space and having piston skirts directed towards each other and slidingly engaged over a common sleeve 36, which divides the cylinder into two separate inner and outer co-axial working chambers, 37, 38 either or both of which are energized to force the pistons apart.

The sealing arrangements between the piston skirts and the common sleeve isolate the working chambers from each other and each comprises two annular seals 2 and 3 spaced apart by a split-ring, here in the form of a split, corrugated, spring washer 4. The space between the seals 2 and 3 communicates with a passage 5 drilled through the body 10 of the piston 32 (or 34) of the actuator and leading to the outer end thereof, terminating at a low pressure region (normally at atmospheric pressure inside a flexible dirt cover 6. This cover is only designed to prevent the ingress of grit or other foreign matter, and in the event of either seal 2 or 3 failing under pressure, fluid will be able to escape past the dirt cover to give a visible indication of seal failure.

The actuator will, of course, remain operative after failure of a single seal of a pair, but with increased pedal travel being required to compensate for loss of fluid from the respective system.

I claim:

1. An hydraulic brake actuator comprising a cylinder, two unitary pistons spaced apart axially of the cylinder and each being sealingly and slidingly received in the cylinder, each piston including an integral annular skirt member extending axially toward the other piston, a sleeve member separate from the cylinder and having its opposite ends sealing and slidably received within the skirt members of the two pistons respectively, said sleeve member dividing the space enclosed within the cylinder between the two pistons into separate inner and outer co-axial fluid pressure chambers, a pair of sealing means one each between each of said piston skirt members and said common sleeve and constructed and arranged to normally isolate the two pressure chambers from each other, means for visually indicating a leaking condition of either of said sealing means wherein each of said sealing means comprises a pair of annular sealing elements between each skirt member and said common sleeve member, said elements being axially spaced apart so as to define a space between them, and passage means in the skirt of each of said piston members leading from said space to atmosphere outwardly of said cylinder so that fluid passing any of said elements from either of said chambers flows freely to a region outside of the cylinder to indicate that a seal element is leaking.

2. The improved actuator of claim 1, including an annular recess in one of said members to house each pair of said annular sealing elements, and resilient spacing means acting between said sealing elements to space the same apart axially.

3. The improved actuator of claim 1, wherein each of said piston skirt members has said annular recess therein for housing the two sealing members, said passage means being disposed in said piston skirt member.

* * * * *